US012236627B2

(12) United States Patent
Lin et al.

(10) Patent No.: US 12,236,627 B2
(45) Date of Patent: Feb. 25, 2025

(54) SYSTEM AND METHOD FOR MEASURING CIRCUMFERENCE OF HUMAN BODY

(71) Applicant: INDUSTRIAL TECHNOLOGY RESEARCH INSTITUTE, Hsinchu (TW)

(72) Inventors: Shang-Yi Lin, Taichung (TW); Tung-Fa Liou, Hsinchu (TW); Chuan-Chi Wang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 477 days.

(21) Appl. No.: 17/561,159

(22) Filed: Dec. 23, 2021

(65) Prior Publication Data

US 2023/0206481 A1  Jun. 29, 2023

(51) Int. Cl.
*G06T 7/62*  (2017.01)
*G01J 5/00*  (2022.01)
(Continued)

(52) U.S. Cl.
CPC .............. *G06T 7/62* (2017.01); *G01J 5/0025* (2013.01); *G01J 5/027* (2013.01); *G06T 7/80* (2017.01);
(Continued)

(58) Field of Classification Search
CPC ... G06T 7/62; G06T 7/80; G06T 2207/10028; G06T 2207/30196; G06T 2207/10048;
(Continued)

(56) References Cited

U.S. PATENT DOCUMENTS 9,727,787 B2    8/2017  Wilf et al.
10,264,980 B2   4/2019  Naimi et al.
(Continued)

FOREIGN PATENT DOCUMENTS

CN    100384220 C  *  4/2008
CN    110037373 A     7/2019
(Continued)

OTHER PUBLICATIONS

K. Nishi, M. Demura, J. Miura and S. Oishi, "Use of Thermal Point Cloud for Thermal Comfort Measurement and Human Pose Estimation in Robotic Monitoring," 2017 IEEE International Conference on Computer Vision Workshops (ICCVW), Venice, Italy, 2017, pp. 1416-1423, doi: 10.1109/ICCVW.2017.168. (Year: 2017).*
(Continued)

*Primary Examiner* — Sumati Lefkowitz
*Assistant Examiner* — Aaron Joseph Sorrin
(74) *Attorney, Agent, or Firm* — Birch, Stwart, Kolasch & Birch, LLP

(57) ABSTRACT

A system and method for measuring circumference of human body are provided. The system includes a 3D sensor configured to obtain a 3D information of a human body with a garment on; a temperature sensor configured to obtain a thermal information of the human body with the garment on; a calibration unit configured to obtain a calibration parameter of the 3D sensor and the temperature sensor; a model generation unit configured to integrate the 3D information and the thermal information according to the calibration parameter to generate a 3D temperature model of the human body with the garment on; and a circumference computation unit configured to retrieve an original profile information corresponding to a target location from the 3D temperature model, and correct the original profile information according to a thermal compensation mechanism to obtain a real
(Continued)

circumference of the human body corresponding to the target location.

16 Claims, 19 Drawing Sheets

(51) Int. Cl.
   *G01J 5/02* (2022.01)
   *G06T 7/80* (2017.01)
(52) U.S. Cl.
   CPC ............... *G06T 2207/10028* (2013.01); *G06T 2207/30196* (2013.01)
(58) Field of Classification Search
   CPC .......... G06T 2207/30208; G06T 17/00; G06T 2207/10004; G06T 15/00; G06T 2207/10024; G06T 2207/20041; G06T 7/194; G06T 7/60; G06T 7/50; G01J 5/0025; G01J 5/027; G01J 5/80; G01K 15/005; A41H 1/02; G01B 11/24; G06V 10/143; G06V 40/10; G06V 10/16; G06V 10/80; G06V 20/64; G06V 2201/12; G06V 40/19; A61B 5/1073; A61B 5/1072; A61B 5/107; A61B 5/01; A61B 5/1077; A61B 5/1075
   See application file for complete search history.

(56) References Cited

U.S. PATENT DOCUMENTS

| | | |
|---|---|---|
| 10,321,728 B1 | 6/2019 | Koh et al. |
| 10,565,782 B2 | 2/2020 | Dorin et al. |
| 2001/0046316 A1* | 11/2001 | Miyano ................ A61B 5/0064 348/E13.072 |
| 2002/0050988 A1* | 5/2002 | Petrov .................... G06V 10/10 345/418 |
| 2014/0107531 A1 | 4/2014 | Baldwin |
| 2019/0216366 A1* | 7/2019 | Hall ...................... A61B 5/1128 |
| 2020/0219311 A1* | 7/2020 | Dorin ........................ G06T 7/62 |
| 2021/0307621 A1 | 10/2021 | Svenson et al. |

FOREIGN PATENT DOCUMENTS

| | | |
|---|---|---|
| CN | 110992417 A | 4/2020 |
| CN | 107292948 B | 3/2021 |
| CN | 112700540 A | 4/2021 |
| KR | 10-2012-0072048 A | 7/2012 |
| KR | 10-1822571 B1 | 1/2018 |
| KR | 10-2086227 B1 | 3/2020 |
| KR | 10-2020-0091832 A | 7/2020 |
| KR | 10-2147189 B1 | 8/2020 |
| TW | I488071 B | 6/2015 |
| TW | 201942777 A | 11/2019 |
| WO | WO 2010/064249 A1 | 6/2020 |

OTHER PUBLICATIONS

Lee, J.-H.; Kim, Y.-K.; Kim, K.-S.; Kim, S. Estimating Clothing Thermal Insulation Using an Infrared Camera. Sensors 2016, 16, 341. https://doi.org/10.3390/s16030341 (Year: 2016).*
English Translation of CN-100384220-C (Year: 2006).*
Zhang, Zhaohua, Jun Li, and Yunyi Wang. "Improving garment thermal insulation property by combining two non-contact measuring tools." Indian Journal of Fibre & Textile Research (IJFTR) 40.4 (2016): 392-398. (Year: 2016).*
Taiwanese Office Action and Search Report for Taiwanese Application No. 110148454, dated Aug. 2, 2022.

* cited by examiner

S160

| Calculate a difference between the temperature value of each of the point cloud data of the original profile information and the body temperature of the human body | —S161 |

↓

| When the difference meets the condition of the temperature difference, correct a coordinate value of each of the point cloud data with the displacement value corresponding to the temperature difference to obtain coordinate values of the point cloud data of the original profile information | —S162 |

↓

| Calculate the real circumference of the human body according to the coordinate values of the point cloud data | —S163 |

FIG. 11

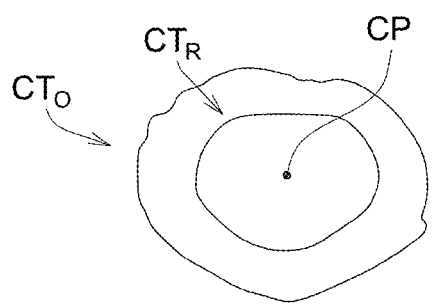

FIG. 12

SYSTEM AND METHOD FOR MEASURING CIRCUMFERENCE OF HUMAN BODY

TECHNICAL FIELD

The disclosure relates to a system and method for measuring circumference of human body.

BACKGROUND

In the past, the measurement of circumference of human body was done by manual measurement or by contact tools to achieve a higher accuracy of measurement. For example, in the case of custom-made suits, manual measurement is usually required to further confirm the size in order to require a good fit.

Some non-contact measuring devices have been developed to measure circumference of human body. In order to obtain accurate information on circumference of human body, the person to be measured is required to be naked or wear a tighter-fitting garment so that the looseness of the garment will not affect the measurement result. However, this is still inconvenient for the person to be measured.

In view of this, there is a need for a system and method for measuring circumference of human body that allows the person to be measured to avoid the inconvenience of putting on and taking off clothing and takes the accuracy of the measurement into account at the same time.

SUMMARY

The disclosure is directed to a system and method for measuring circumference of human body to solve the aforementioned problems.

According to one embodiment, a system for measuring circumference of human body is provided. The system for measuring circumference of human body includes a 3D sensor, a temperature sensor, a calibration unit, a model generation unit and a circumference computation unit. The 3D sensor is configured to obtain a 3D information of a human body with a garment on. The temperature sensor is configured to obtain a thermal information of the human body with the garment on. The calibration unit is configured to obtain a calibration parameter of the 3D sensor and the temperature sensor. The model generation unit is configured to integrate the 3D information and the thermal information according to the calibration parameter to generate a 3D temperature model of the human body with the garment on. The circumference computation unit is configured to retrieve an original profile information corresponding to a target location from the 3D temperature model, and correct the original profile information according to a thermal compensation mechanism to obtain a real circumference of the human body corresponding to the target location.

According to another embodiment, a method for measuring circumference of human body is provided. The method for measuring circumference of human body includes the following steps. First, a calibration parameter of a 3D sensor and a temperature sensor is obtained. Next, a 3D information of a human body with a garment on is obtained by the 3D sensor. After that, a thermal information of the human body with the garment on is obtained by the temperature sensor. Then, the 3D information and the thermal information are integrated according to the calibration parameter to generate a 3D temperature model of the human body with the garment on. Afterwards, an original profile information corresponding to a target location is retrieved from the 3D temperature model. Finally, the original profile information is corrected according to a thermal compensation mechanism to obtain a real circumference of the human body corresponding to the target location.

The above and other embodiments of this disclosure will become better understood with regard to the following detailed description. The following description is made with reference to the accompanying drawings.

BRIEF DESCRIPTION OF THE DRAWINGS

FIG. 11 is the step of correcting the original profile information according to the thermal compensation mechanism to obtain the real circumference of the human body corresponding to the target location according to one embodiment of the disclosure.

FIG. 12 is a schematic diagram showing obtaining the real profile information of the human body according to one embodiment of the disclosure.

DETAILED DESCRIPTION

In the present disclosure, the 3D information and thermal information obtained from the 3D sensor and the temperature sensor are integrated to generate a 3D temperature model of the human body, and the original profile information is corrected by a thermal compensation mechanism to obtain the real circumference of the human body. By doing so, the person to be measured does not have to take off the garment, and the desired circumference information may be accurately obtained.

Each embodiment of the disclosure will be described in detail below and illustrated with drawings. In addition to these detailed descriptions, the disclosure may be broadly implemented in other embodiments, and any easy substitution, modification, or equivalent variation of the described embodiments is included in the scope of the disclosure and is covered by the scope of the claims thereafter. In the description of the specification, many specific details and examples of embodiments are provided to provide the reader with a more complete understanding of the disclosure; however, these specific details and examples of embodiments should not be considered as limitations of the disclosure. In addition, well known steps or elements are not described in detail to avoid unnecessary limitations of the disclosure.

Figure 1:
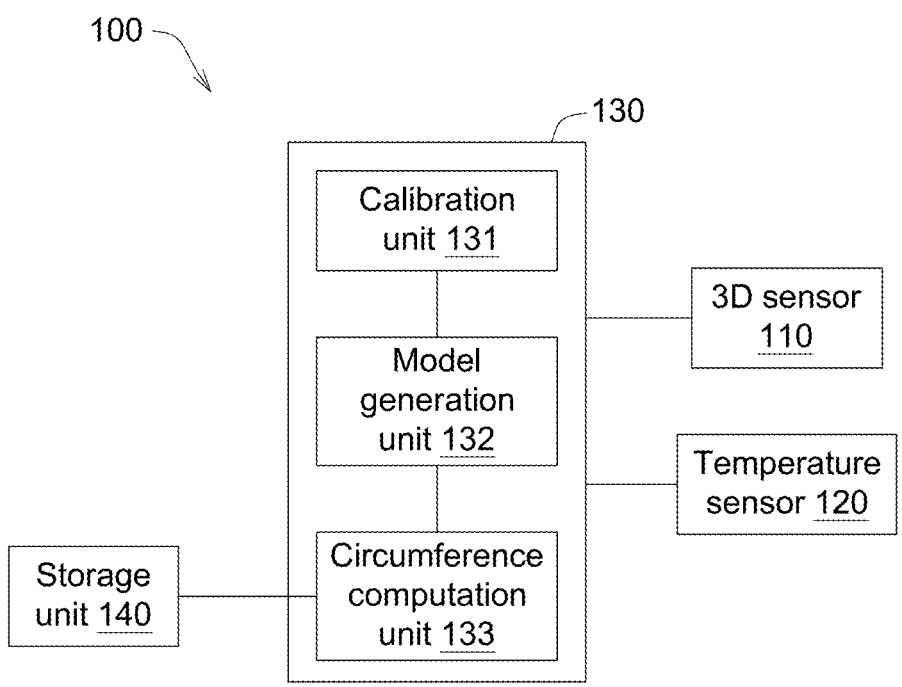
FIG. 1 is a block diagram of a system for measuring circumference of human body according to one embodiment of the disclosure.

FIG. 1 is a block diagram of a system 100 for measuring circumference of human body according to one embodiment of the disclosure. Referring to FIG. 1, the system 100 for measuring circumference of human body may include a three-dimensional (3D) sensor 110, a temperature sensor 120, a calibration unit 131, a model generation unit 132, a circumference computation unit 133 and a storage unit 140. The 3D sensor 110 may be based on active measurement, such as scattered structured light, phase structured light or time of flight (TOF) technology; the 3D sensor 110 may also be based on passive measurement, such as stereo vision technology by using dual-camera. The temperature sensor 120 may be, for example, a long-range temperature sensor, which may be, but is not limited to, a face-type sensor. The calibration unit 131, the model generation unit 132 and the circumference computation unit 133 may be implemented by a hardware circuit or software, for example, by an integrated circuit or a processor 130. The 3D sensor 110 and the temperature sensor 120 are coupled to the integrated circuit or the processor 130. The storage unit 140 is coupled to the circumference computation unit 133 to store and remember the information required by the circumference computation unit 133. In other embodiments, the system 100 for measuring circumference of human body may not include the storage unit 140. That is, the storage unit 140 is not a necessary element for the system 100 for measuring circumference of human body.

FIGS. 2A-2G illustrate some configurations of systems 100A-100G for measuring circumference of human body according to different embodiments of the disclosure. Of course, these configurations are for illustrative purpose, and it should be understood that the system for measuring circumference of human body of the present disclosure is not limited to these configurations.

Figure 2A:
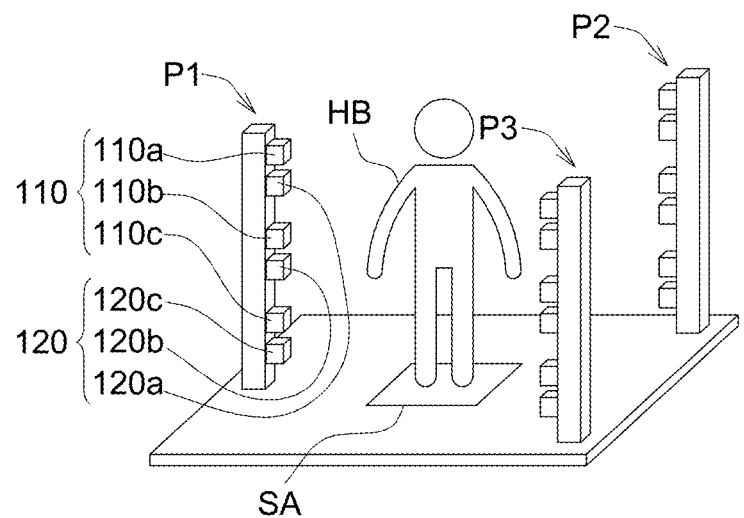
FIGS. 2A-2G illustrate some configurations of systems for measuring circumference of human body according to different embodiments of the disclosure.
Figure 2B:
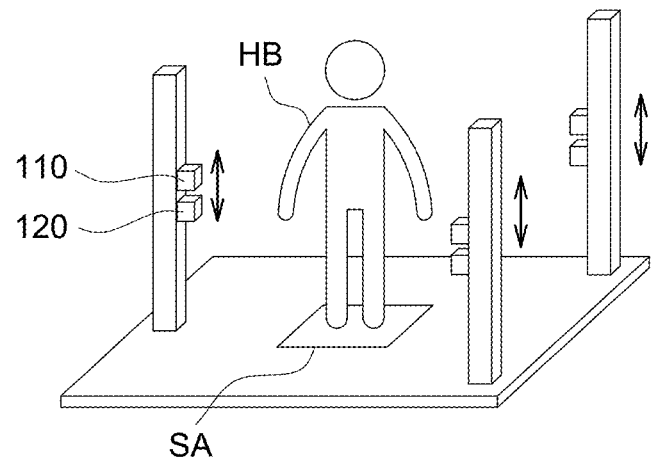
Figure 2C:
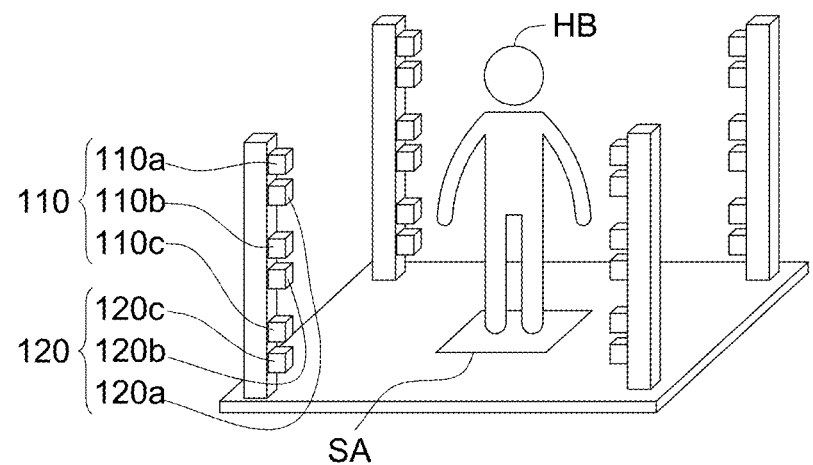
Figure 2D:
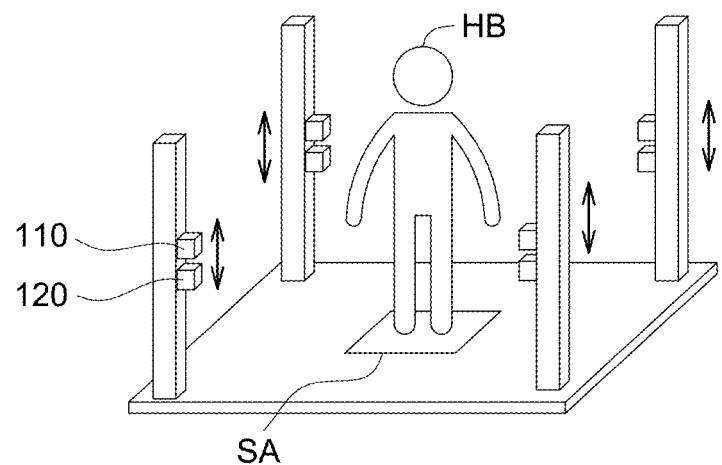
Figure 2E:
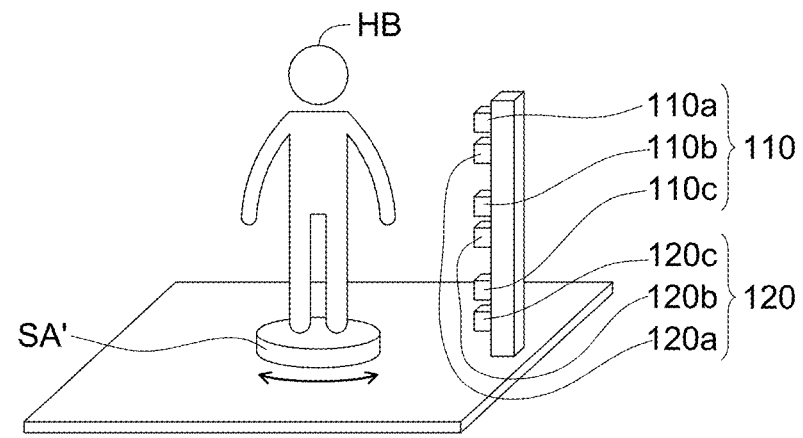
Figure 2F:
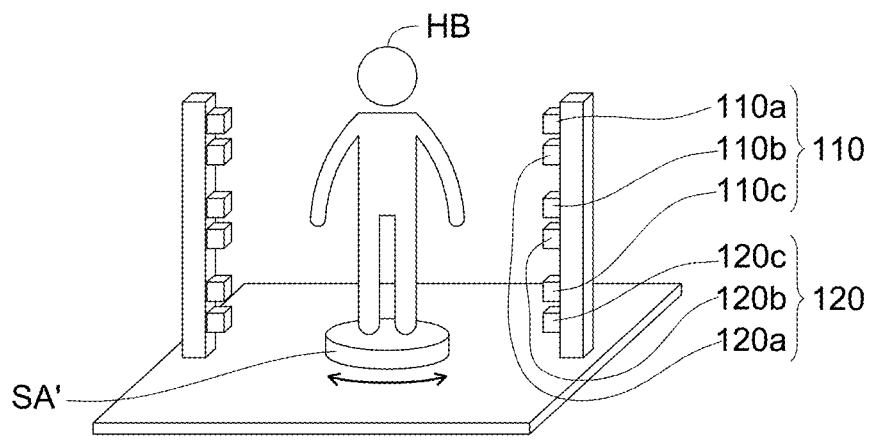
Figure 2G:
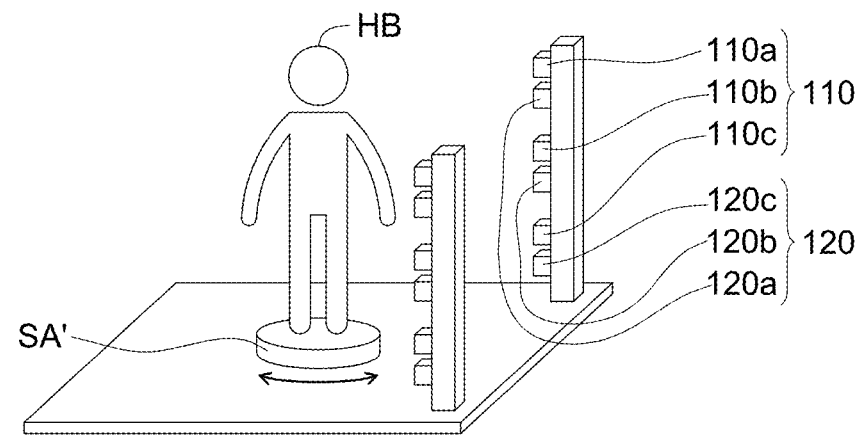

In the system 100A for measuring circumference of human body of FIG. 2A, the 3D sensor 110 and the temperature sensor 120 may be disposed on a column, and the columns are disposed at positions P1, P2, and P3 around the standing area SA, respectively. The person HB to be measured may stand on the standing area SA with a garment on for the 3D sensor 110 and the temperature sensor 120 to collect the required information. In the embodiment of FIG. 2A, each column is equipped with three sets of 3D sensors 110 and temperature sensors 120, and the field of view of each set of 3D sensor 110 and temperature sensor 120 may capture information about different body parts of the person HB to be measured, for example, the 3D sensor 110a and temperature sensor 120a located at the uppermost part of the column may capture information about the upper body of the person HB to be measured, and the 3D sensor 110b and temperature sensor 120b located at the middle of the column may capture information about the torso of the person HB to be measured, and the 3D sensor 110c and temperature sensor 120c located at the lowermost part of the column may capture information about the lower body of the person HB to be measured, but the present disclosure is not limited thereto. In addition, each column may be equipped with one set of 3D sensor 110 and temperature sensor 120, as long as the field of view may cover the body parts to be captured. Alternatively, in other embodiment, for example in the system 100B for measuring circumference of human body as shown in FIG. 2B, the columns may be disposed at positions similar to FIG. 2A, but with one set of 3D sensor 110 and temperature sensor 120 on each of the columns, and the 3D sensor 110 and the temperature sensor 120 are movable, e.g., in the direction of extension of the column, or in the direction perpendicular to the column, to capture information about different body parts of the person HB to be measured in a comprehensive manner. As for other configurations, for example, in the system 100C for measuring circumference of human body of FIG. 2C, the columns may be disposed in four corners differently than in FIG. 2A; in the system 100D for measuring circumference of human body of FIG. 2D, the columns may be disposed in four corners differently than in FIG. 2B. In the system 100E for measuring circumference of human body of FIG. 2E, there is one column equipped with three sets of 3D sensors 110 and temperature sensors 120, with the difference that the standing area SA' is rotatable, e.g., 360 degrees, to capture information about different body parts of the person HB to be measured in a comprehensive manner; in another non-illustrated embodiment, which may have a configuration similar to that in FIG. 2E, but with one set of 3D sensor 110 and temperature sensor 120 on the column, and the 3D sensor 110 and the temperature sensor 120 are movable. In the system 100F for measuring circumference of human body of FIG. 2F, the configuration is similar to that of FIG. 2E, except that there are two columns, each on the opposite side of the standing area SA', so that the rotation angle of the standing area SA' may be smaller than that of FIG. 2E; in another non-illustrated embodiment, which may have a configuration similar to that in FIG. 2F, but with one set of 3D sensor 110 and temperature sensor 120 on each column, and the 3D sensor 110 and the temperature sensor 120 are movable. In the system 100G for measuring circumference of human body in FIG. 2G, the configuration is similar to that in FIG. 2F, also with two columns, but the columns are respectively disposed in two adjacent corners; in another non-illustrated embodiment, which may have a configuration similar to that in FIG. 2G, but with one set of 3D sensor 110 and temperature sensor 120 on each column, and the 3D sensor 110 and the temperature sensor 120 are movable.

Figure 3:
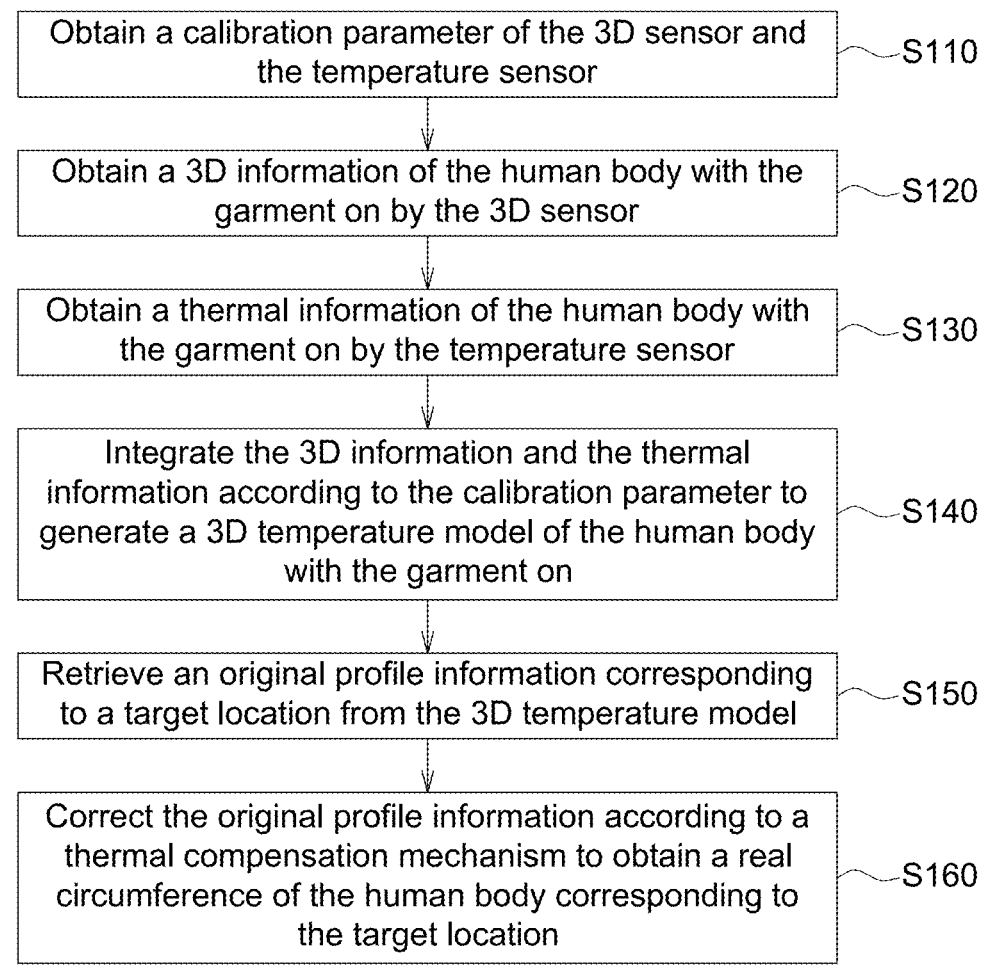
FIG. 3 is a flowchart of a method for measuring circumference of human body according to one embodiment of the disclosure.

FIG. 3 is a flowchart of a method S100 for measuring circumference of human body according to one embodiment of the disclosure. Referring to FIG. 1 and FIG. 3, first, in the step S110, a calibration parameter of the 3D sensor 110 and the temperature sensor 120 is obtained by the calibration unit 131. It is shown in FIG. 3 that the step S110 is performed before the step S120 and the step S130; however, it should be understood that the step S110 may also be performed after the step S120 and/or the step S130, and before the step S140; the disclosure does not specifically limit the sequence of the step S110.

Figure 4:
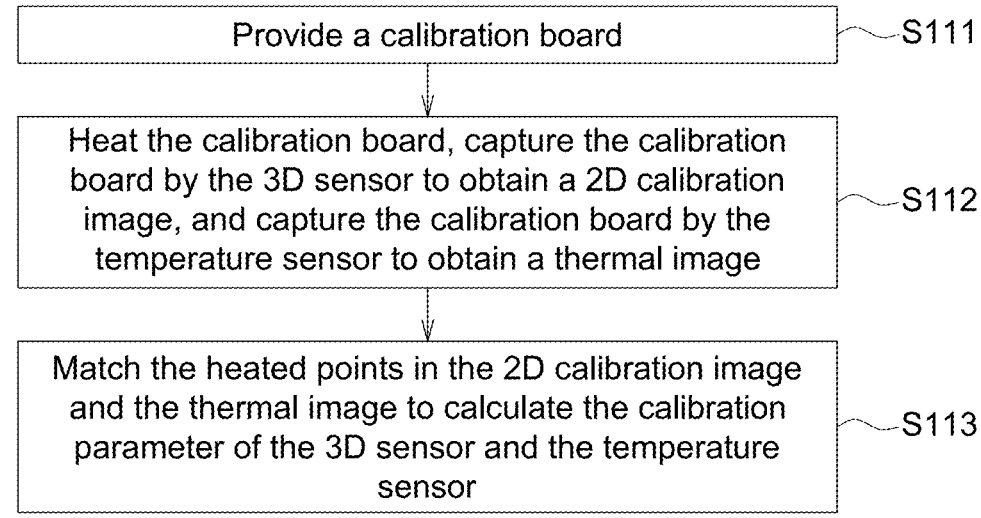
FIG. 4 is the step of obtaining the calibration parameter of the 3D sensor and the temperature sensor according to one embodiment of the disclosure.
Figure 5A:
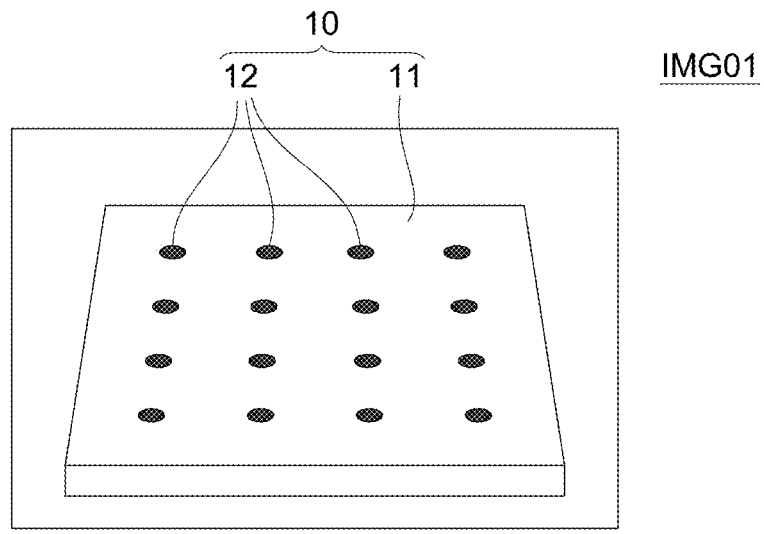
FIG. 5A is a schematic diagram showing the 2D calibration image obtained by the 3D sensor according to one embodiment of the disclosure.
Figure 5B:
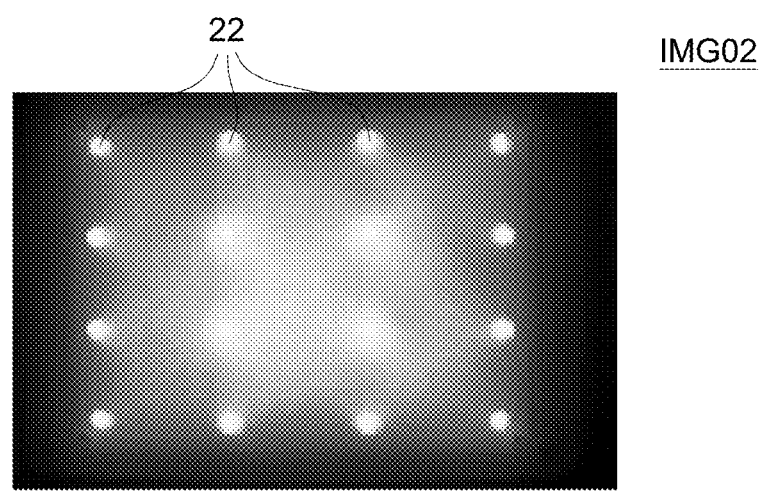
FIG. 5B is a schematic diagram showing the thermal image obtained by the temperature sensor according to one embodiment of the disclosure.

FIG. 4 is the step S110 of obtaining the calibration parameter of the 3D sensor 110 and the temperature sensor 120 according to one embodiment of the disclosure. FIG. 5A is a schematic diagram showing the 2D calibration image IMG01 obtained by the 3D sensor 110 according to one embodiment of the disclosure. FIG. 5B is a schematic diagram showing the thermal image IMG02 obtained by the temperature sensor 120 according to one embodiment of the disclosure. Referring to FIG. 1 and FIG. 4, in the step S111, a calibration board is provided. The calibration board 10 may include a substrate 11 and a plurality of heated points 12 on the substrate 11 as shown in FIG. 5A, with the heated points 12 arranged at predetermined intervals. The heated points 12 may be made of metal; in contrast, the substrate 11 may be thermally insulated. Therefore, when the calibration board 10 is heated, the temperature of the heated points 12 will be higher than that of the substrate 11.

Next, in the step S112, the calibration board 10 is heated. When the calibration board 10 is heated, the 3D sensor 110 captures the calibration board 10 to obtain a two-dimensional (2D) calibration image IMG01, and the temperature sensor 120 captures the calibration board 10 to obtain a thermal image IMG02.

Referring to FIG. 5A, in the embodiment, the substrate 11 may be a white heat shield board, and the heated points 12 may be black metal points embedded in the substrate 11. In FIG. 5A, the heated points 12 are metal round points for example, but may be other shapes of metal points, such as metal square points, metal triangle points, metal polygon points, metal ellipse points, metal hollow ring points, etc. Here, the 3D sensor 110 has the function of taking a 2D image, which may be a color image or a black and white image. Based on this function, when the 3D sensor 110 obtains the 2D calibration image IMG01, the 3D sensor 110 may clearly distinguish the difference between the substrate 11 and the heated points 12, and then recognize the coordinates of the heated point 12. For example, if the 2D calibration image IMG01 is a color image, the 3D sensor 110 may perform a gradient analysis of the luminance values to the color image to find the contours of the heated points 12. After that, the shape of the heated points 12 shown in the 2D calibration image IMG01 is not circular but elliptical due to the angle of the shot. In this regard, the 3D sensor 110 fits the contour of each heated point 12 with an ellipse to obtain the center point of each heated point 12. In one embodiment, if the heated point is a metal point of another shape, it is necessary to fit the heated point with a corresponding shape.

Referring to FIG. 5B, when the calibration board 10 is heated, the temperature sensor 120 may calculate the average temperature of the thermal image IMG02. After that, search for the heat source block having the temperature larger than the average temperature, the heat source block corresponding to the location of each heated point 22 in the thermal image IMG02. Next, the center of each heat source block is calculated to obtain the center point of each heated point 22.

Referring to FIG. 1 and FIG. 4, in the step S113, the calibration unit 131 matches the heated points 12 and 22 in the 2D calibration image IMG01 and the thermal image IMG02 to calculate the calibration parameter of the 3D sensor 110 and the temperature sensor 120. After the center point of each heated point 12 and the center point of each heated point 22 are obtained, the calibration unit 131 may match multiple sets of heated points 12 and 22 one by one to calculate the internal parameter and external parameter of the 3D sensor 110 and temperature sensor 120 for subsequent use.

Figure 6A:
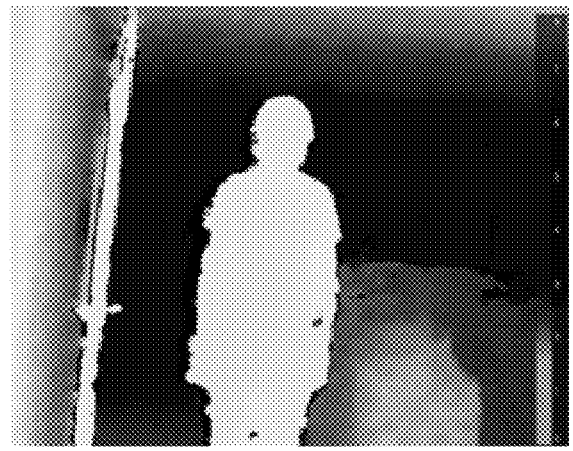
FIG. 6A is a schematic diagram showing the depth image obtained by the 3D sensor according to one embodiment of the disclosure.
Figure 6B:
FIG. 6B is a schematic diagram showing the 2D image obtained by the 3D sensor according to one embodiment of the disclosure.

In the embodiments, in addition to acquiring the 2D image, the 3D sensor 110 may also acquire the depth image corresponding to the 2D image. FIG. 6A is a schematic diagram showing the depth image IMG1 obtained by the 3D sensor 110 according to one embodiment of the disclosure. FIG. 6B is a schematic diagram showing the 2D image IMG2 obtained by the 3D sensor 110 according to one embodiment of the disclosure. Referring to FIG. 6A and FIG. 6B, the 2D image IMG2 corresponds to the depth image IMG1. The 3D sensor 110 may use the depth image IMG1 and the 2D image IMG2 to generate the 3D information of the 3D image. For example, if the 2D image IMG2 is a color image, the 3D sensor 110 may generate the 3D information for the 3D color image; in this case, the 3D information may include a plurality of point cloud data corresponding to the depth image IMG1, and each point cloud datum has a 3D spatial coordinate value and an RGB coordinate value.

Referring to FIG. 1 and FIG. 3, after the calibration parameter of the 3D sensor 110 and the temperature sensor 120 is obtained, in the step S120, a 3D information of the human body with the garment on is obtained by the 3D sensor 110; in the step S130, a thermal information of the human body with the garment on is obtained by the temperature sensor 120. Here, the step S120 and the step S130 may be performed sequentially or simultaneously, and the disclosure does not limit the sequence of the step S120 and the step S130.

Figure 7A:
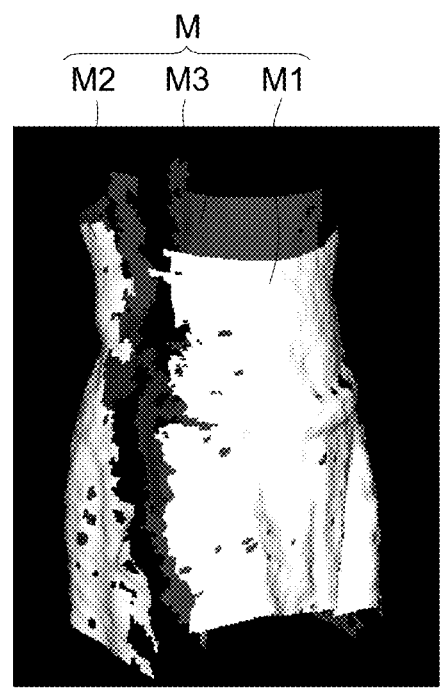
FIG. 7A is a schematic diagram showing the 3D information integrated into the same spatial coordinate according to one embodiment of the disclosure.

Here, the configuration of system 100A for measuring circumference of human body shown in FIG. 2A is used to further illustrate the step S120 and the step S130. FIG. 7A is a schematic diagram showing the 3D information M integrated into the same spatial coordinate according to one embodiment of the disclosure. Referring to FIG. 1, FIG. 2A and FIG. 7A, the 3D information M in FIG. 7A does not cover the whole body of the person HB to be measured, but is extracted for the waist and hip parts. In other words, the 3D information M of step S120 in FIG. 3 may be obtained by the 3D sensor 110b located in the middle of each column. The 3D sensor 110b at position P1 may obtain the first part of the 3D information M1, the 3D sensor 110b at position P2 may obtain the second part of the 3D information M2, and the 3D sensor 110b at position P3 may obtain the third part of the 3D information M3. Thereafter, the model generation unit 132 may integrate the first part of the 3D information M1, the second part of the 3D information M2, and the third part of the 3D information M3 into the same spatial coordinate using the calibration parameter of each 3D sensor 110b to obtain the 3D information M as shown in FIG. 7A.

Figure 7B:
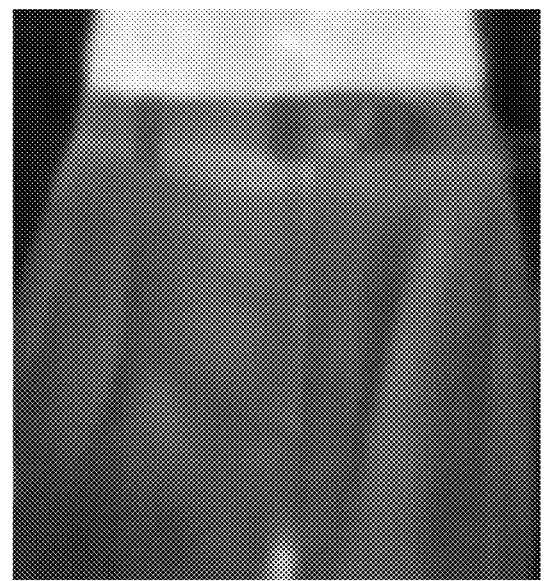
FIG. 7B shows a first part of the thermal information obtained by the temperature sensor at a position according to one embodiment of the disclosure.

In addition, the thermal information of the step S130 in FIG. 3 may be obtained by the temperature sensor 120b located in the middle of each column. Referring to FIG. 2A and FIG. 7B, FIG. 7B shows a first part of the thermal information IMG3 obtained by the temperature sensor 120b at a position P1 according to one embodiment of the disclosure. Similarly, although it is not shown, the temperature sensors 120b at positions P2 and P3 also obtain the corresponding thermal information at the corresponding positions.

Figure 7C:
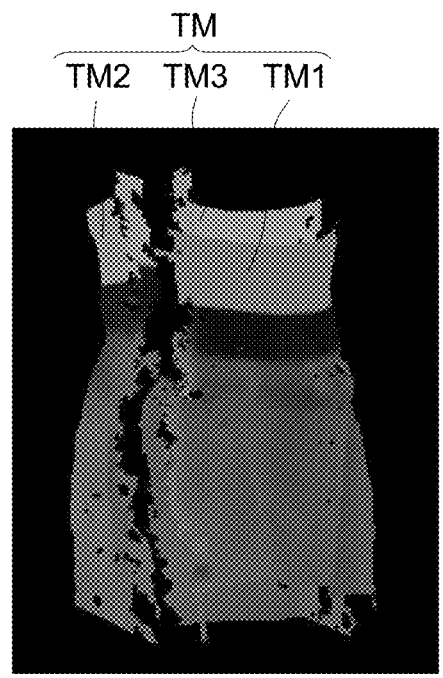
FIG. 7C shows the 3D temperature model of the human body with the garment on according to one embodiment of the disclosure.

FIG. 7C shows the 3D temperature model TM of the human body with the garment on according to one embodiment of the disclosure. Referring to FIG. 1, FIG. 3, FIG. 7A, FIG. 7B and FIG. 7C, in the step S140, the 3D information M and the thermal information are integrated by the model generation unit 132 according to the calibration parameter previously obtained to generate a 3D temperature model TM of the human body with the garment on. The model generation unit 132 may project the 3D information onto a coordinate system of the thermal information by using the calibration parameter to generate the 3D temperature model TM. For example, the model generation unit 132 may use the calibration parameters of each 3D sensor 110b and each temperature sensor 120b to map the coordinate value of each point cloud datum of the first part of the 3D information M1 to a specific position in the first part of the thermal information IMG3, to map the coordinate value of each point cloud datum of the second part of the 3D information M2 to a specific position in the second part of the thermal information (not shown), and to map the coordinate value of each point cloud datum of the third part of the 3D information M3 to a specific position in the third part of the thermal information (not shown), to generate the first part of the 3D temperature model TM1, the second part of the 3D temperature model TM2 and the third part of the 3D temperature model TM3, respectively. Therefore, the point cloud information of the 3D temperature model TM has not only the coordinates of the three-dimensional space but also a pair of coordinates. Therefore, each point cloud datum of the 3D temperature model TM has a corresponding temperature value in addition to the 3D spatial coordinate value.

Figure 8A:
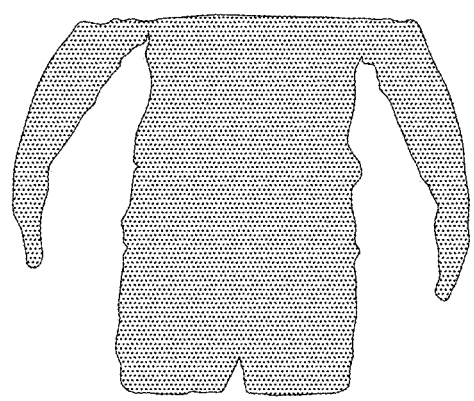
FIG. 8A is a schematic diagram showing the point cloud data of the 3D temperature model according to one embodiment of the disclosure.
Figure 8B:
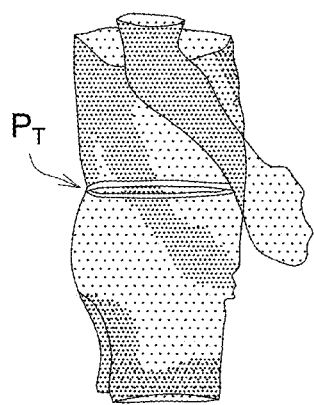
FIG. 8B is a schematic diagram showing identifying the target location from the 3D temperature model according to one embodiment of the disclosure.
Figure 9:
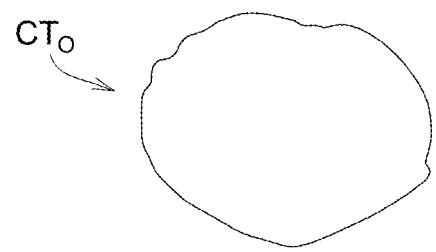
FIG. 9 is a schematic diagram showing the original profile information corresponding to the target location according to one embodiment of the disclosure.

FIG. 8A is a schematic diagram showing the point cloud data of the 3D temperature model TM according to one embodiment of the disclosure; FIG. 8B is a schematic diagram showing identifying the target location $P_T$ from the 3D temperature model TM according to one embodiment of the disclosure; FIG. 9 is a schematic diagram showing the original profile information $CT_O$ corresponding to the target location $P_T$ according to one embodiment of the disclosure. Referring to FIG. 1, FIG. 3, FIG. 8A, FIG. 8B and FIG. 9, in the step S150, an original profile information $CT_O$ corresponding to a target location $P_T$ is retrieved from the 3D temperature model TM by the circumference computation unit 133. In one embodiment, if the target location $P_T$ is the waist circumference, then an appropriate location from the most convex point of the human buttocks to about 12-16 cm upward may be found, as the target location $P_T$ shown in FIG. 8B. Then, the point cloud data at this location are retrieved according to the horizontal profile, as the original profile information $CT_O$ shown in FIG. 9.

Next, in the step S160, the original profile information $CT_O$ is corrected according to a thermal compensation mechanism by the circumference computation unit 133 to obtain a real circumference of the human body corresponding to the target location $P_T$.

Since the original profile information $CT_O$ is the information obtained from the human body with the garment on, it also includes the influence of the thickness of the garment and does not correspond to the real circumference of the human body. In this case, the influence of the garment must be removed. In the embodiment, the original profile information $CT_O$ is corrected by a thermal compensation mechanism, allowing the real circumference of the person to be measured to be measured without having to take off the garment, while maintaining good accuracy.

Figure 10:
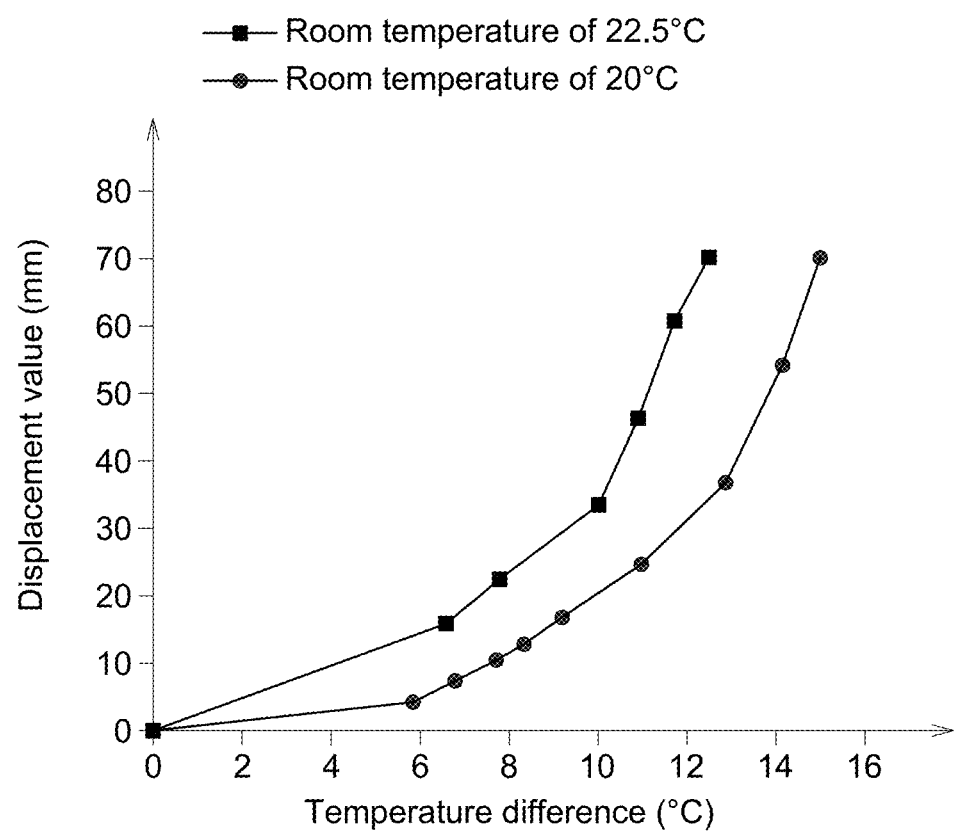
FIG. 10 is a correspondence diagram of the thermal compensation mechanism according to one embodiment of the disclosure.

Referring to FIG. 10, a correspondence diagram of the thermal compensation mechanism according to one embodiment of the disclosure is shown. The thermal compensation mechanism may be stored in advance in the storage unit 140 of FIG. 1 for use by the circumference computation unit 133. The thermal compensation mechanism may include a correspondence relationship between the temperature difference and the displacement value. The displacement value represents the correction distance for the original profile information $CT_O$ to remove the influence of the garment, and the value of this correction distance varies with the temperature difference. The correspondence relationship between the temperature difference and the displacement value may be obtained by collecting experimental data, wherein the temperature difference is the difference between the external temperature (e.g., the surface temperature of the garment which the human body wears) and the body temperature of the human body, and the external temperature is the temperature value of each cloud point datum in the original profile information $CT_O$. In one embodiment, the collected experimental data may be shown in Table 1 and Table 2.

TABLE 1

| temperature difference (° C.) | displacement value (mm) |
|---|---|
| 0 | 0 |
| 6.59 | 15.9 |
| 7.76 | 22.3 |
| 10.02 | 33.4 |
| 10.91 | 46.2 |
| 11.73 | 60.5 |
| 12.5 | 70 |

TABLE 2

| temperature difference (° C.) | displacement value (mm) |
|---|---|
| 0 | 0 |
| 5.86 | 4.28 |
| 6.78 | 7.34 |
| 7.72 | 10.42 |
| 8.36 | 12.74 |
| 9.2 | 16.72 |
| 10.98 | 24.6 |
| 12.86 | 36.6 |
| 14.15 | 54.1 |
| 15 | 70 |

Table 1 shows the data collected at a room temperature of 22.5° C.; Table 2 shows the data collected at a room temperature of 20° C. In practical implement, the body temperature of the human body and room temperature may be obtained from the thermal information obtained from the temperature sensor 120. For example, the temperature of any exposed part of the person to be measured in the thermal information may be retrieved as the body temperature of the human body, such as, but not limited to, the temperature of the person's hands; and with respect to the room temperature, the temperature of any mechanism of the system for measuring circumference of human body in the thermal information may be retrieved, such as, but not limited to, the temperature of each column in FIG. 2A.

FIG. 11 is the step S160 of correcting the original profile information $CT_O$ according to the thermal compensation mechanism to obtain the real circumference of the human body corresponding to the target location $P_T$ according to one embodiment of the disclosure; FIG. 12 is a schematic diagram showing obtaining the real profile information $CT_R$ of the human body according to one embodiment of the disclosure. Referring to FIG. 1, FIG. 10 and FIG. 11, in the step S161, the circumference computation unit 133 calculates a difference between the temperature value of each of the point cloud data of the original profile information $CT_O$ and the body temperature of the human body. In the step S162, when the difference meets the condition of the temperature difference, the circumference computation unit 133 corrects a coordinate value of each of the point cloud data with the displacement value corresponding to the temperature difference to obtain coordinate values of the point cloud data of the original profile information $CT_O$.

For example, when the room temperature is 20° C., the circumference computation unit 133 calculates the difference between the temperature value of one of the point cloud data of the original profile information $CT_O$ and the body temperature of the human body to be 6.59° C., the circumference computation unit 133 may select a displacement value of 15.9 millimeters (mm) corresponding to the temperature difference of 6.59° C., based on the curve corresponding to the room temperature of 20° C. in Table 1 or FIG. 10, as the basis for correcting the coordinate values of the point cloud data. The circumference computation unit 133 then corrects the coordinate values of the point cloud data by a distance of 15.9 mm inward toward the center point CP of the original profile information $CT_O$. After that, the circumference computation unit 133 continues to correct the coordinate values of all point cloud data of the original profile information $CT_O$ in this manner to obtain the real profile information $CT_R$ of the human body, as shown in FIG. 12.

If the room temperature is 20° C., the circumference computation unit 133 calculates the difference of 7.5° C. between the temperature value of one of the point cloud data of the original profile information $CT_O$ and the body temperature of the human body. Although there is no pair with a temperature difference of 7.5° C. in Table 1, the interpolated values of the pairs (6.59, 15.9) and (7.76, 22.3) may be used for the circumference computation unit 133, and the corresponding displacement value of 20.88 mm is obtained. Furthermore, even if the room temperature is not 20° C. or 22.5° C., the circumference computation unit 133 may use the interpolation or extrapolation of the two curves in FIG. 10 to obtain a corresponding pair.

Next, in the step S163, the circumference computation unit 133 calculates the real circumference of the human body according to the coordinate values of the point cloud data. For example, as shown in FIG. 12, the circumference computation unit 133 calculates the perimeter based on the coordinate values of all point cloud data of the real profile information $CT_R$ of the human body to obtain the real circumference of the human body, e.g. waist circumference.

Referring to FIG. 10, from which it can be seen that when the temperature difference varies in a smaller range, the displacement value only needs to be slightly corrected. For example, at the room temperature of 22.5° C., when the temperature difference varies from 0° C. to 4° C., the displacement value is only slightly corrected by about 10 mm. In contrast, when the temperature difference varies in a larger range, the displacement value needs to be corrected by a larger amount. For example, at the room temperature of 22.5° C., when the temperature difference varies from 10° C. to 12° C., that is, the temperature difference is only 2° C., the displacement value is nearly 30 mm instead. In other words, when the temperature difference is smaller, it means that the surface temperature of the garment is close to the body temperature. In this case, the displacement value may be adjusted with higher accuracy, and the accuracy of the correction is also higher. This is also the reason why the measurement effect is better when the person to be measured wears a tighter garment.

Table 3 shows the error comparison between the real circumference of the human body for waist circumference obtained by the method for measuring circumference of human body according to the present disclosure and the waist circumference value (in centimeters) obtained by hand measurement for the persons to be measured of different body shapes wearing the garment with different degrees of tightness.

TABLE 3

| No. | Result of hand measurement | Original value (with garment) | Original error | Error ratio (%) | Value after correction | Error after correction | Error ratio (%) |
|---|---|---|---|---|---|---|---|
| A | 77 | 95 | 18 | 23.38 | 80 | 3 | 3.90 |
| B | 80 | 102.4 | 22.4 | 28.00 | 85 | 5 | 6.25 |
| C | 79 | 102 | 23 | 29.11 | 76 | −3 | −3.80 |
| D | 79 | 96 | 17 | 21.52 | 75 | −4 | −5.06 |
| E | 79 | 101 | 22 | 27.85 | 78 | −1 | −1.27 |
| F | 79 | 95 | 16 | 20.25 | 74 | −5 | −6.33 |
| G | 79 | 119 | 40 | 50.63 | 81 | 2 | 2.53 |
| H | 85 | 92 | 7 | 8.24 | 78 | −7 | −8.24 |
| I | 85 | 111 | 26 | 30.59 | 84 | −1 | −1.18 |
| J | 85 | 110 | 25 | 29.41 | 85 | 0 | 0.00 |
| K | 85 | 109 | 24 | 28.24 | 76 | −9 | −10.59 |
| L | 95 | 125 | 30 | 31.58 | 98 | 3 | 3.16 |
| M | 95 | 108 | 13 | 13.68 | 100 | 5 | 5.26 |
| N | 95 | 106 | 11 | 11.58 | 94 | −1 | −1.05 |
| | | | Average | 25.29 | | Average | 4.19 |

As shown in Table 3, the original value is the waist circumference value calculated without performing the thermal compensation mechanism, i.e., the waist circumference value calculated according to the original profile information $CT_O$; the value after correction is the waist circumference value calculated according to the thermal compensation mechanism, i.e., the waist circumference value calculated according to the real profile information $CT_R$ of the human body. The result shows that the average error ratio may be significantly reduced from 25.29% to 4.19% after the correction of the thermal compensation mechanism. In addition, there is only a slight average error of 4.19% when comparing the value after correction by the thermal compensation mechanism with the result of hand measurement, showing that the accuracy is still good.

FIGS. 13A-13I illustrate some other configurations of systems 200A-200I for measuring circumference of human body according to different embodiments of the disclosure. Of course, these configurations are for illustrative purpose, and it should be understood that the system for measuring circumference of human body of the present disclosure is not limited to these configurations.

Referring to FIGS. 13A-13I, the difference with the systems 100A-100G for measuring circumference of human body shown in FIGS. 2A-2G is that the systems 200A-200I for measuring circumference of human body includes at least one reflecting mirror 150. The reflecting mirror 150 may be a flat reflecting mirror, which may be a metal mirror made of metal, or a mirror body containing a metal reflective surface, such as a glass coated with a metal film. When the 3D sensor 110 and the temperature sensor 120 are disposed on one side of the person HB to be measured, the reflecting mirror 150 is disposed on another side of the person HB to be measured, so that the 3D sensor 110 and the temperature sensor 120 may both directly sense and sense the person HB to be measured through the reflection of the reflecting mirror 150.

Figure 13A:
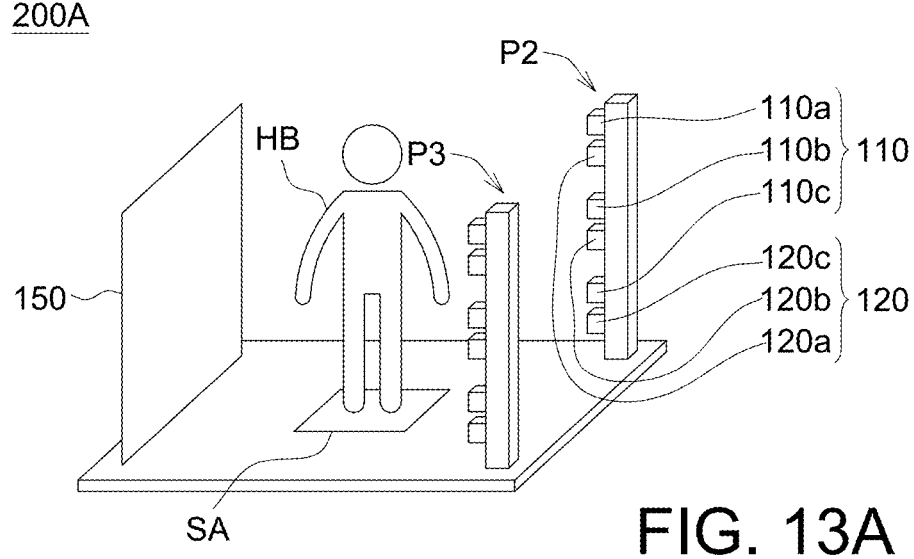
FIGS. 13A-13I illustrate some other configurations of systems for measuring circumference of human body according to different embodiments of the disclosure.
Figure 14:
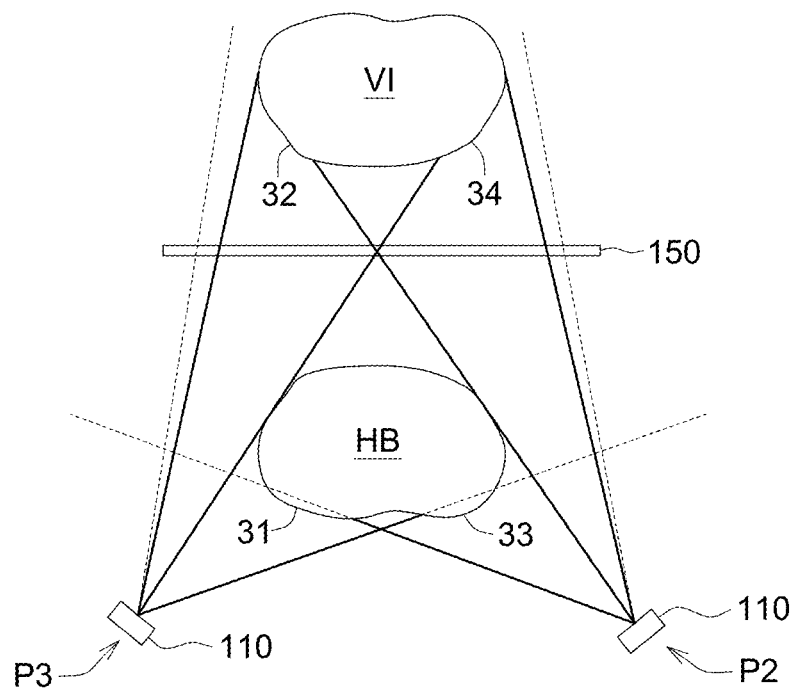
FIG. 14 shows a top view of the configuration as in FIG. 13A.
Figure 15:
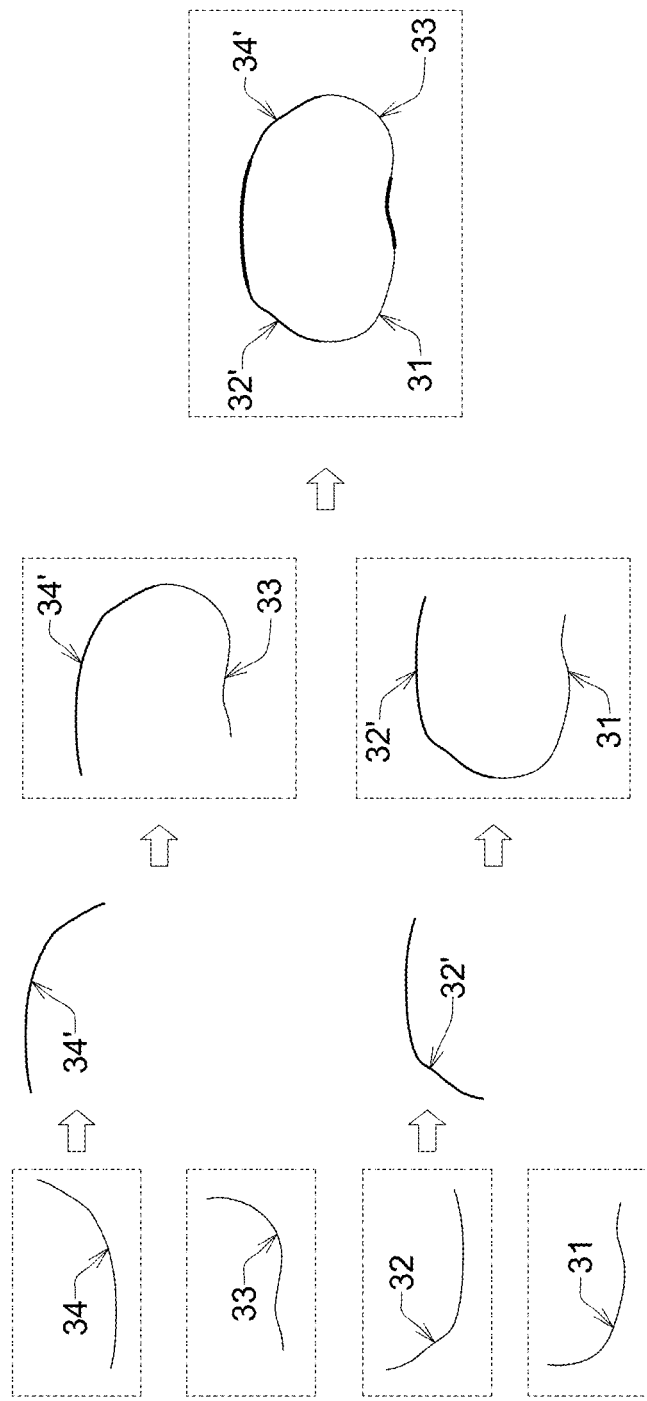
FIG. 15 is a schematic diagram showing processing the 3D information according to the example of FIG. 14.

More specifically, referring to FIG. 14 and FIG. 15, FIG. 14 shows a top view of the configuration as in FIG. 13A, wherein the dashed lines are the field of view of the two 3D sensors 110, respectively; FIG. 15 is a schematic diagram showing processing the 3D information according to the example of FIG. 14. Although FIG. 14 only shows the condition that the 3D sensors 110 sense the person HB to be measured, the same sensing method may be applied to the temperature sensors 120 and will not be repeated here. The 3D sensor 110 at position P3 may directly sense the first part of the person HB to be measured to obtain the first part of the 3D information 31, and sense the second part of the person HB to be measured through the reflection of the reflecting mirror 150 to obtain the second part of the 3D information 32. Here, the second part of the 3D information 32 corresponds to the part of the virtual image VI of the second part of the person HB to be measured imaged in the reflecting mirror 150. The 3D sensor 110 at position P2 may directly sense the third part of the person HB to be measured to obtain the third part of the 3D information 33, and sense the fourth part of the person HB to be measured through the reflection of the reflecting mirror 150 to obtain the fourth part of the 3D information 34. Here, the fourth part of the 3D information 34 corresponds to the part of the virtual image VI of the fourth part of the person HB to be measured imaged in the reflecting mirror 150.

As shown in FIG. 1, FIG. 14 and FIG. 15, after the first part of the 3D information 31, the second part of the 3D information 32, the third part of the 3D information 33 and the fourth part of the 3D information 34 are obtained, the model generation unit 132 may first perform coordinate transformation such as mirroring and rotation translation on the second part of the 3D information 32 and the fourth part of the 3D information 34 to obtain the transformed 3D information 32' and 3D information 34'. Next, the model generation unit 132 may integrate the first part of the 3D information 31 obtained by the 3D sensor 110 at position P3 and the transformed 3D information 32', and integrate the third part of the 3D information 33 obtained by the 3D sensor 110 at position P2 and the transformed 3D information 34', by using the calibration parameter of each 3D sensor 110. After that, the first part of the 3D information 31, the transformed 3D information 32', the third part of the 3D information 33 and the transformed 3D information 34' are then integrated into the same spatial coordinate.

Figure 13B:
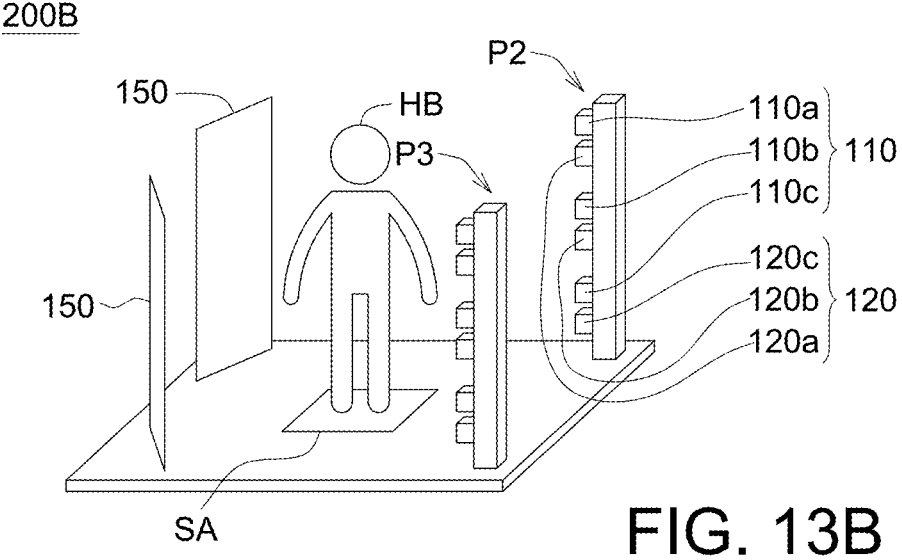
Figure 13C:
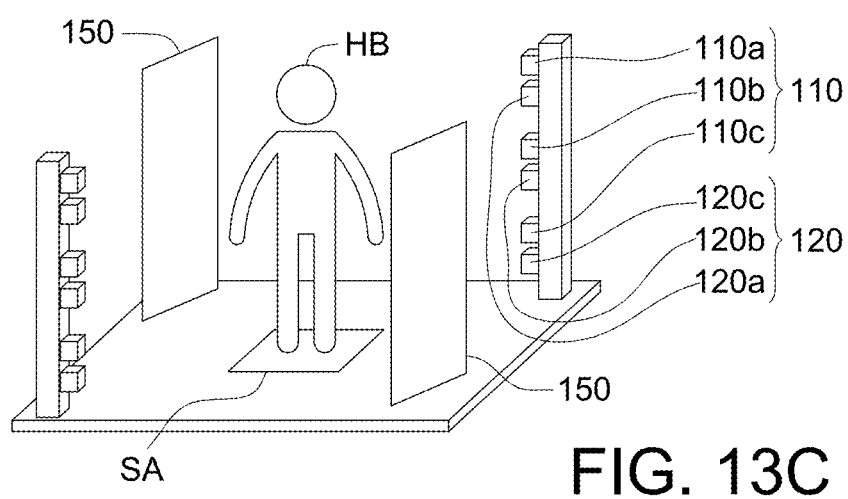
Figure 13D:
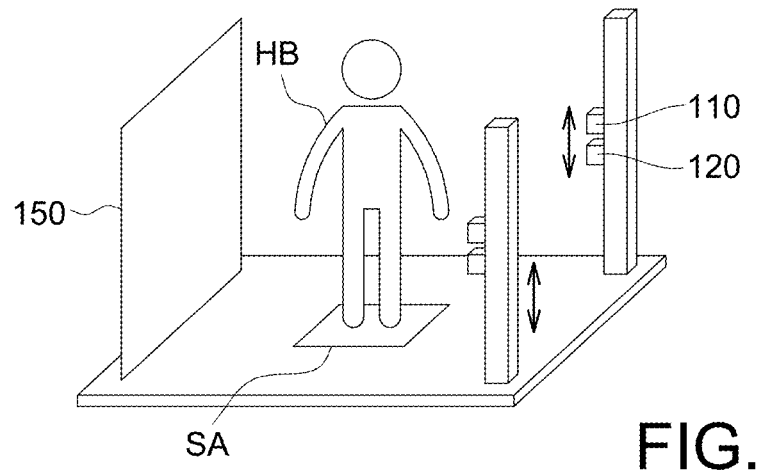
Figure 13E:
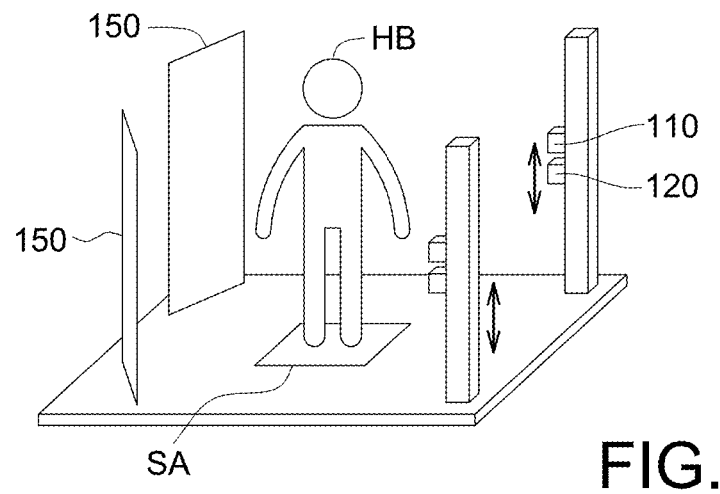
Figure 13F:
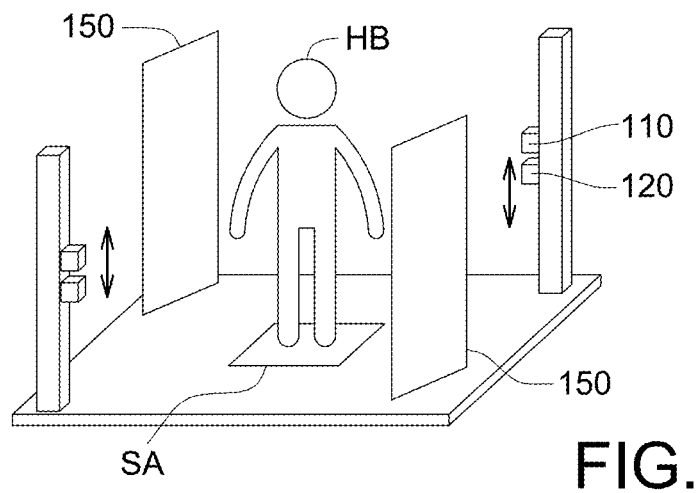
Figure 13G:
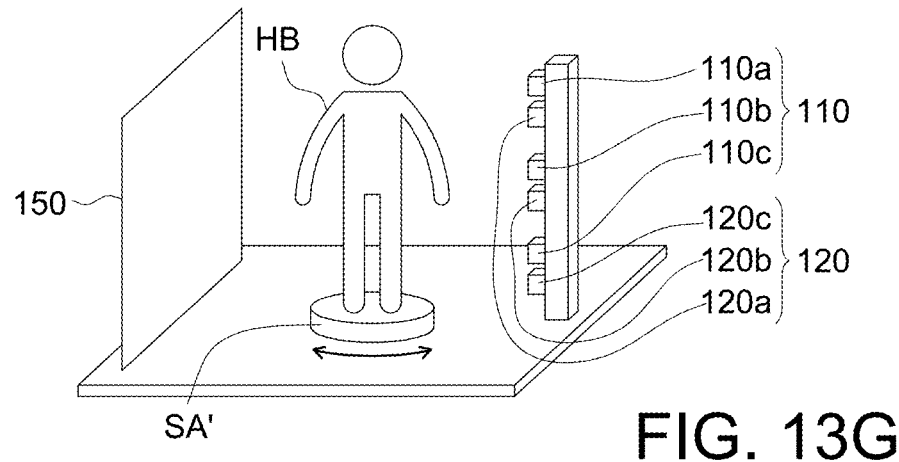
Figure 13H:
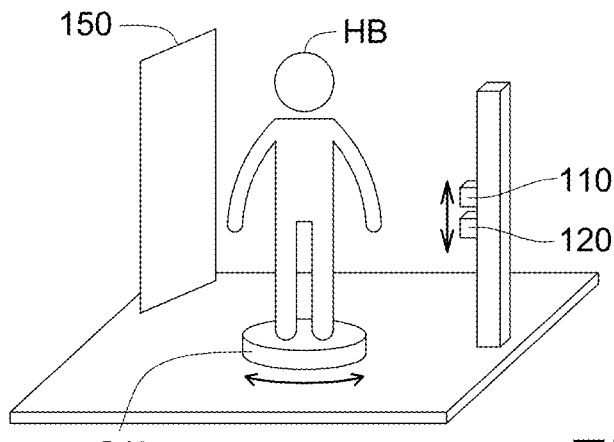
Figure 13I:
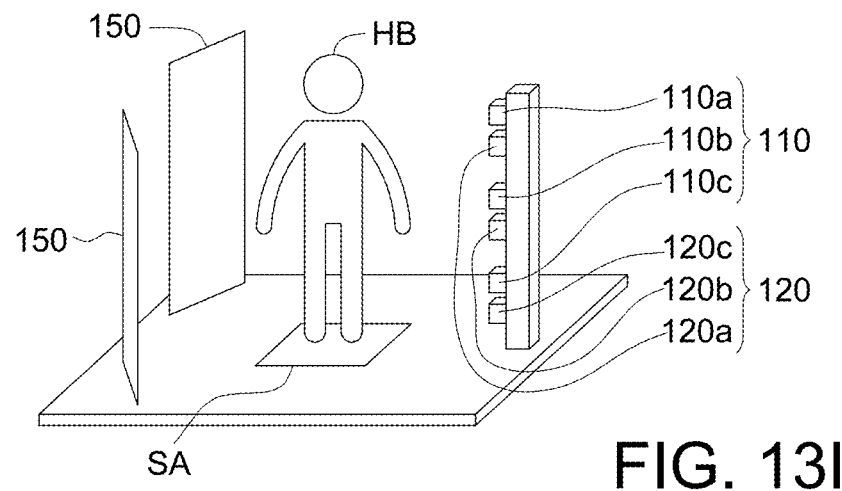
Figure 16A:
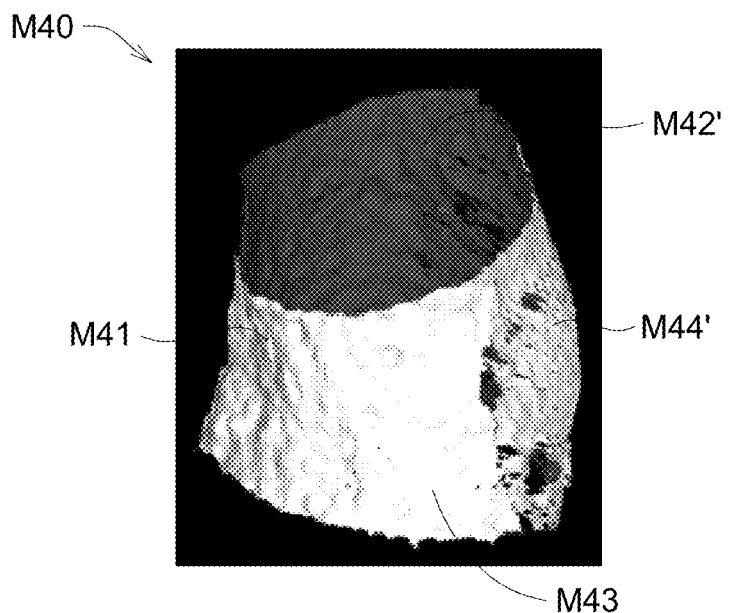
FIG. 16A and FIG. 16B are schematic diagrams showing the 3D information integrated into the same spatial coordinate at different viewing angles according to another embodiment of the disclosure.
Figure 16B:
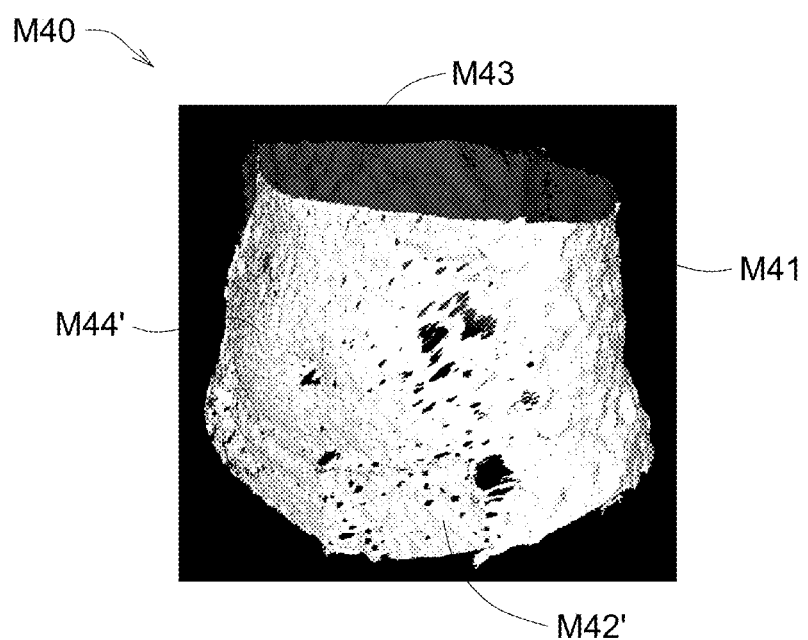

The configuration of the system 200B for measuring circumference of human body shown in FIG. 13B is used as an example to illustrate. FIG. 16A and FIG. 16B are schematic diagrams showing the 3D information M40 integrated into the same spatial coordinate at different viewing angles according to another embodiment of the disclosure. Referring to FIG. 1, FIG. 13B, FIG. 16A and FIG. 16B, the 3D information M40 in FIG. 16A and FIG. 16B does not cover the whole body of the person HB to be measured, but is extracted for the waist and hip parts. In other words, the 3D information M40 may be obtained by the 3D sensor 110b located in the middle of each column. The 3D sensor 110b at position P3 may directly sense the first part of the person HB to be measured to obtain the first part of the 3D information M41, and sense the second part of the person HB to be measured through the reflection of the reflecting mirror 150 to obtain the second part of the 3D information. In addition, the model generation unit 132 further performs coordinate transformation such as mirroring and rotation translation on the second part of the 3D information to obtain the transformed 3D information M42'. The 3D sensor 110b at position P2 may directly sense the third part of the person HB to be measured to obtain the third part of the 3D information M43, and sense the fourth part of the person HB to be measured through the reflection of the reflecting mirror 150 to obtain the fourth part of the 3D information. In addition, the model generation unit 132 further performs coordinate transformation such as mirroring and rotation translation on the fourth part of the 3D information to obtain the transformed 3D information M44'. After that, the model generation unit 132 may integrate the first part of the 3D information M41, the transformed 3D information M42', the third part of the 3D information M43 and the transformed 3D information M44', by using the calibration parameter of each 3D sensor 110, into the same spatial coordinate, to obtain the 3D information M40 as shown in FIG. 16A and FIG. 16B.

Figure 17A:
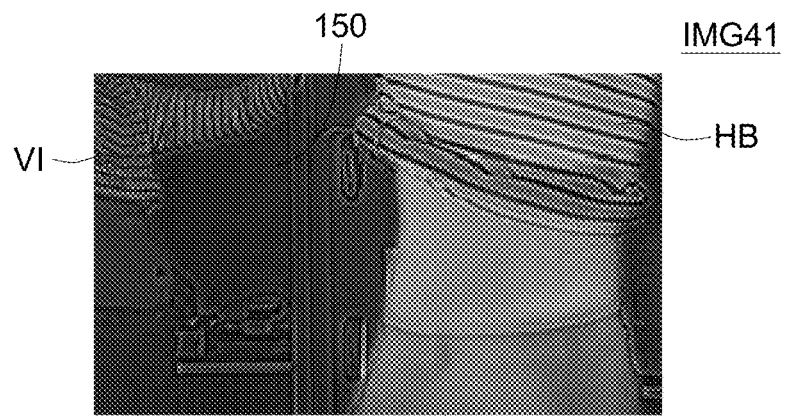
FIG. 17A and FIG. 17B show the thermal information respectively obtained by the temperature sensors at two positions according to another embodiment of the disclosure.
Figure 17B:
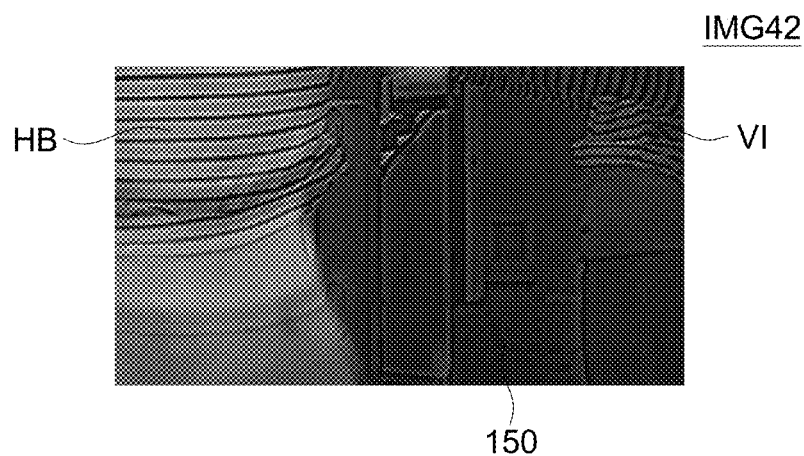

Referring to FIG. 13B, FIG. 17A and FIG. 17B, FIG. 17A and FIG. 17B show the thermal information IMG41, IMG42 respectively obtained by the temperature sensors 120b at two positions P2, P3 according to another embodiment of the disclosure. Similar to the 3D sensor 110b, the temperature sensor 120b may both directly sense and sense the temperature of the person HB to be measured through the reflection of the reflecting mirror 150.

Figure 18A:
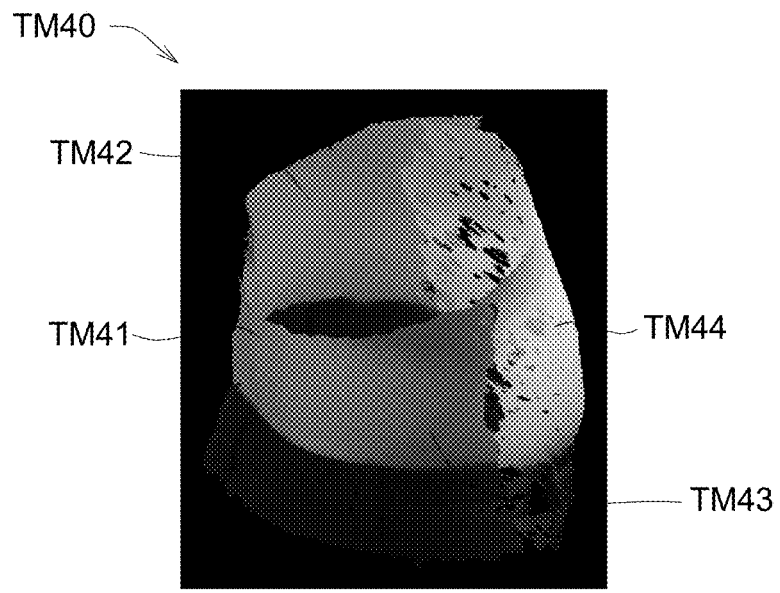
FIG. 18A and FIG. 18B show the 3D temperature model of the human body with the garment on at different viewing angles according to another embodiment of the disclosure.
Figure 18B:
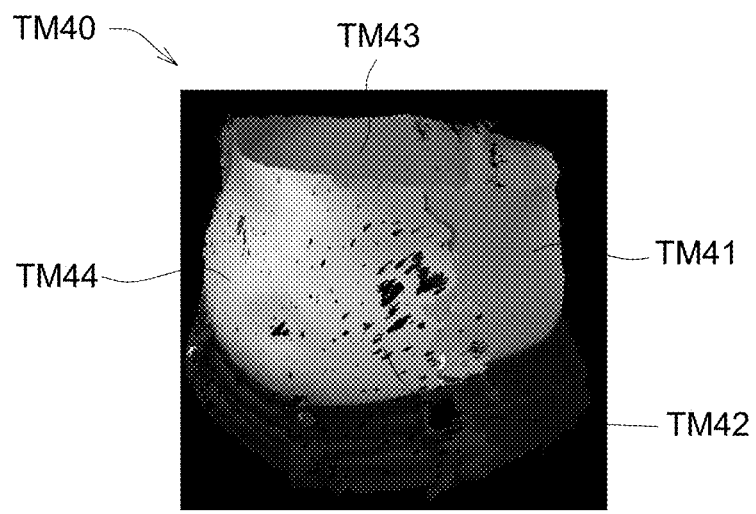

FIG. 18A and FIG. 18B show the 3D temperature model TM40 of the human body with the garment on at different viewing angles according to another embodiment of the disclosure. Referring to FIG. 1, FIG. 16A, FIG. 16B, FIG. 17A, FIG. 17B, FIG. 18A and FIG. 18B, the model generation unit 132 may project the 3D information M40 onto a coordinate system of the thermal information by using the calibration parameter of each 3D sensor 110b and each temperature sensor 120b to respectively generate the first part of the 3D temperature model TM41, the second part of the 3D temperature model TM42, the third part of the 3D temperature model TM43 and the fourth part of the 3D temperature model TM44, to generate the 3D temperature model TM40.

The above embodiments may further reduce the overall space occupied by the system through the configuration of the reflecting mirror 150. For example, under the configuration of FIG. 13A, the overall space occupied by the system may be reduced by about 26% compared to the configuration of FIG. 2C, and the number of 3D sensor 110 and temperature sensor 120 may be reduced. In addition, the above embodiments with the configuration of the reflecting mirror 150 may obtain a more completely connected and crack-free 3D temperature model TM40 than the embodiment without the reflecting mirror 150.

In summary, the system and method for measuring circumference of human body provided according to the present disclosure produces a 3D temperature model of a human body with a garment on by integrating the 3D information and the thermal information obtained by the 3D sensor and the temperature sensor, and corrects the original profile information by a thermal compensation mechanism to obtain a real circumference of the human body. Thus, the person to be measured does not have to take off the garment, and the desired circumference information may be accurately obtained. In addition, in the embodiments, the reflecting mirror is further provided to not only reduce the overall space occupied by the system, but also to reduce the number of 3D sensor and temperature sensor.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for measuring circumference of human body comprising:
a three-dimensional (3D) sensor configured to obtain a 3D information of a human body with a garment on;
a temperature sensor configured to obtain a thermal information of the human body with the garment on;
a calibration unit configured to obtain a calibration parameter of the 3D sensor and the temperature sensor;
a model generation unit configured to integrate the 3D information and the thermal information according to the calibration parameter to generate a 3D temperature model of the human body with the garment on; and
a circumference computation unit configured to retrieve an original profile information corresponding to a target location from the 3D temperature model, and correct the original profile information according to a thermal compensation mechanism to obtain a real circumference of the human body corresponding to the target location;
wherein the 3D information comprises a plurality of point cloud data corresponding to a depth image, the 3D temperature model comprises the plurality of point cloud data, and the plurality of point cloud data of the 3D temperature model are each provided with a temperature value;
the thermal compensation mechanism comprises a correspondence relationship between a plurality of temperature differences and a plurality of displacement values; and
the original profile information has a center point, the circumference computation unit calculates a difference between the temperature value of each of the plurality of point cloud data of the original profile information and a body temperature of the human body, and in response to the difference equal to one temperature difference of the plurality of temperature differences, the circumference computation unit obtains one displacement value of the plurality of displacement values corresponding to the one temperature difference, and corrects a coordinate value of each of the plurality of point cloud data by a distance of the one displacement value along a direction towards the center point, so as to obtain a plurality of real coordinate values of a real profile information, and to calculate the real circumference of the human body according to the plurality of real coordinate values of the real profile information.

2. The system for measuring circumference of human body according to claim 1, wherein the thermal information comprises a body temperature of the human body and a surface temperature of the garment.

3. The system for measuring circumference of human body according to claim 1, wherein the 3D sensor is capable of acquiring a depth image and a two-dimensional image corresponding to the depth image.

4. The system for measuring circumference of human body according to claim 1, wherein the calibration parameter is obtained through capturing a calibration board by the 3D sensor and the temperature sensor, the calibration board comprises a substrate and a plurality of heated points on the substrate;
when the calibration board is heated, the 3D sensor captures the calibration board to obtain a two-dimensional (2D) calibration image, the temperature sensor captures the calibration board to obtain a thermal image, and the calibration unit matches the plurality of heated points in the 2D calibration image and the thermal image to calculate the calibration parameter of the 3D sensor and the temperature sensor.

5. The system for measuring circumference of human body according to claim 1, wherein the model generation unit projects the 3D information onto a coordinate system of the thermal information by using the calibration parameter to generate the 3D temperature model.

6. The system for measuring circumference of human body according to claim 1, wherein the 3D sensor and the temperature sensor are configured to be movable.

7. The system for measuring circumference of human body according to claim 1, wherein a number of the 3D sensor and the temperature sensor is plural.

8. The system for measuring circumference of human body according to claim 1, further comprising a standing area suitable for the human body to stand, wherein the standing area is rotatable.

9. The system for measuring circumference of human body according to claim 1, further comprising a reflecting mirror, the 3D sensor and the temperature sensor disposed on one side of the human body, and the reflecting mirror disposed on another side of the human body;
wherein the 3D sensor directly senses a part of the 3D information of the human body with the garment on, and senses another part of the 3D information of the human body with the garment on through reflection of the reflecting mirror, to integrate the part of the 3D information and the another part of the 3D information into the 3D information;

the temperature sensor directly senses a part of the thermal information of the human body with the garment on, and senses another part of the thermal information of the human body with the garment on through reflection of the reflecting mirror, to integrate the part of the thermal information and the another part of the thermal information into the thermal information.

10. The system for measuring circumference of human body according to claim 9, wherein the reflecting mirror is a flat reflecting mirror.

11. The system for measuring circumference of human body according to claim 9, wherein the reflecting mirror comprises a metal reflective surface.

12. A method for measuring circumference of human body comprising:

obtaining, by using a three-dimensional (3D) sensor, a 3D information of a human body with a garment on;

obtaining, by using a temperature sensor, a thermal information of the human body with the garment on;

obtaining a calibration parameter of the 3D sensor and the temperature sensor;

integrating the 3D information and the thermal information according to the calibration parameter to generate a 3D temperature model of the human body with the garment on;

retrieving an original profile information corresponding to a target location from the 3D temperature model; and correcting the original profile information according to a thermal compensation mechanism to obtain a real circumference of the human body corresponding to the target location;

wherein the 3D information comprises a plurality of point cloud data corresponding to a depth image, the 3D temperature model comprises the plurality of point cloud data, and the plurality of point cloud data of the 3D temperature model are each provided with a temperature value;

the thermal compensation mechanism comprises a correspondence relationship between a plurality of temperature differences and a plurality of displacement values; and the original profile information has a center point, and the step of correcting the original profile information according to the thermal compensation mechanism to obtain the real circumference of the human body corresponding to the target location comprises:

calculating a difference between the temperature value of each of the plurality of point cloud data of the original profile information and a body temperature of the human body, and in response to the difference equal to one temperature difference of the plurality of temperature differences, one displacement value of the plurality of displacement values corresponding to the one temperature difference is obtained, and a coordinate value of each of the plurality of point cloud data is corrected by a distance of the one displacement value along a direction towards the center point, so as to obtain a plurality of real coordinate values of a real profile information, and to calculate the real circumference of the human body according to the plurality of real coordinate values of the real profile information.

13. The method for measuring circumference of human body according to claim 12, wherein the thermal information comprises a body temperature of the human body and a surface temperature of the garment.

14. The method for measuring circumference of human body according to claim 12, wherein the step of obtaining the calibration parameter of the 3D sensor and the temperature sensor comprises:

providing a calibration board comprising a substrate and a plurality of heated points on the substrate;

wherein when the calibration board is heated, the 3D sensor captures the calibration board to obtain a two-dimensional (2D) calibration image, and the temperature sensor captures the calibration board to obtain a thermal image; and matching the plurality of heated points in the 2D calibration image and the thermal image to calculate the calibration parameter of the 3D sensor and the temperature sensor.

15. The method for measuring circumference of human body according to claim 12, wherein in the step of integrating the 3D information and the thermal information according to the calibration parameter to generate the 3D temperature model of the human body with the garment on, the 3D information is projected onto a coordinate system of the thermal information by using the calibration parameter to generate the 3D temperature model.

16. The method for measuring circumference of human body according to claim 12, wherein:

the step of obtaining, by using the 3D sensor, the 3D information of the human body with the garment on comprises:

directly sensing a part of the 3D information of the human body with the garment on and sensing another part of the 3D information of the human body with the garment on through reflection of a reflecting mirror by using the 3D sensor, to integrate the part of the 3D information and the another part of the 3D information into the 3D information;

the step of obtaining, by using the temperature sensor, the thermal information of the human body with the garment on comprises:

directly sensing a part of the thermal information of the human body with the garment on and sensing another part of the thermal information of the human body with the garment on through reflection of the reflecting mirror by using the temperature sensor, to integrate the part of the thermal information and the another part of the thermal information into the thermal information;

wherein the 3D sensor and the temperature sensor are disposed on one side of the human body, and the reflecting mirror is disposed on another side of the human body.

* * * * *